United States Patent [19]

Siebers et al.

[11] 3,946,842
[45] Mar. 30, 1976

[54] ELECTRIC AND FLUID CONTROLS FOR CLUTCH AND TRANSMISSION

[76] Inventors: Gunter Siebers, Dahlmannstr. 32, 85 Nurnberg; Karl Prenzel, Chemnitzerstr. 27a, 8541 Neu-Katzwang; Hans Barthel, Bothmerstr. 16, 85 Nurnberg, all of Germany

[22] Filed: Oct. 17, 1973

[21] Appl. No.: 407,280

Related U.S. Application Data

[62] Division of Ser. No. 46,555, June 15, 1970, Pat. No. 3,808,738.

[30] Foreign Application Priority Data

June 13, 1969 Germany............................ 1930046

[52] U.S. Cl............. 192/3.58; 192/91 R; 137/625.64
[51] Int. Cl.²...................... F16H 5/36; B60K 21/00
[58] Field of Search ... 192/3.58, 91 R, 85 R, 109 F; 137/625.64

[56] References Cited
UNITED STATES PATENTS

| | | |
|---|---|---|
| 2,756,851 | 7/1956 | Collins............................ 192/109 F |
| 2,924,111 | 2/1960 | Backus et al. ................. 192/3.58 X |
| 3,061,058 | 10/1962 | Barth .................... 192/3.58 |
| 3,095,757 | 7/1963 | Thoma................................ 74/687 |
| 3,103,826 | 9/1963 | Jaeschke...................... 192/3.58 X |
| 3,417,845 | 12/1968 | Swanson ..................... 192/87.19 |
| 3,439,584 | 4/1969 | Kaptur..................... 137/625.64 X |
| 3,478,851 | 11/1969 | Smyth et al...................... 74/339 X |
| 3,530,668 | 9/1970 | Siebers et al. .................... 74/866 X |
| 3,561,367 | 2/1971 | Black............................. 192/109 F |

*Primary Examiner*—Benjamin W. Wyche
*Attorney, Agent, or Firm*—Stevens, Davis, Miller & Mosher

[57] ABSTRACT

A gear box having driving members and driven members and hydraulically actuated means for engaging the driving members with driven members to effect gear change is provided with a friction clutch for coupling the engine to the input shaft. The friction clutch is actuated by a piston slidably disposed in a cylinder. The piston is connected to the movable part of the clutch. The piston is actuated by a hydraulically operated main valve of relatively large volume which in turn is actuated by a smaller electromagnetically operated primary valve to provide for rapid actuation of the clutch.

1 Claim, 4 Drawing Figures

ELECTRIC AND FLUID CONTROLS FOR CLUTCH AND TRANSMISSION

This is a division of application Ser. No. 46,555, filed June 15, 1970, now U.S. Pat. No. 3,808,738.

The invention relates to a method of performing gear changes in multi-ratio change-speed gear-boxes, especially for heavy goods vehicles, in which the axially sliding pinions or dog clutches providing the different gear ratios are moved electro-hydraulically and in which, on initiation of a gear change the disengagement of the previous ratio, the subsequent bringing into synchronism of the pinions or clutches to be brought into engagement for the next selected ratio and the engagement of these are performed automatically, and preferably also the declutching of the engine before the above-mentioned disengagement of the gears, and the renewed engagement of the engine after the gears are engaged. The invention further relates to means for carrying out the method according to the invention comprising an electric or electronic control member which is set in motion by hand and/or automatically in accordance with the engine load and speed and the ratio already engaged, and which controls the automatic performance of each gear change, and which further is provided with a source of pressure fluid and with actuating cylinders of which the pistons are each connected to a respective one of the members in the gear box to be moved during a gear change.

Various endeavours have already been made to allow the changing of the gear in multi-ratio gear boxes to be performed automatically. All these developments have been in one direction leading to relatively long gear-change times, during which period the engine and the driven component of the machine on which the gear-box is mounted or of the vehicle with which it is equipped are disconnected from each other. Because of the disadvantage that results from this and also because of other disadvantages to be mentioned these proposals have not proved successful and have not been able to become adopted.

In contrast to these it is the aim of the invention to allow rapid performance of the gear changes in multi-ratio gear-boxes. This is achieved by a method of the kind outlined above but distinguished according to the invention in that the engagement of the pinions or dog clutches when they reach synchronism is performed in a sudden manner by the piston of an hydraulic actuating cylinder in that this piston is acted on or relieved of a sufficiently large volume of fluid to cause this sudden displacement by means of an instantaneously acting two-stage electro-hydraulic control. According to a further feature of the invention particularly rapid reduction or acceleration of the speed of rotation of one of the two members that are to be brought into engagement during the gear-change, is undertaken in order to bring them into synchronism, while the connections of these members to the driving engine associated with the gear-box and the output shaft driven by the gear-box are interrupted so that only small masses need to be slowed down or speeded up. The slowing down or speeding up of one of the two components to be undertaken in order to bring into synchronism those components that are to be brought into engagement at each gear-change is preferably initiated by the attainment of the condition of disengagement of the previously engaged components.

The apparatus according to the invention for carrying out the method characterised above, comprising an electric or electronic control member which is initiated by hand and/or automatically in accordance with the engine load and speed and the ratio already engaged, and which controls the automatic course of each gear-change, and which further comprises a source of pressure fluid and actuating cylinders of which the pistons are connected respectively to one of the components of the gear-box to be moved during a gear-change, is characterised in that the actuating cylinders are each connected through a large diameter pipe to at least one hydraulically operated two-position three-way main valve, the valve being moreover connected through large diameter pipes to a pressure fluid reservoir and a fluid sump, and uncovering a large cross-sectional area in each direction of operation, and each such valve is controlled by an electro-magnetic two-position three-way primary valve with a small actuating winding connected to the control member, which primary valve uncovers only a small cross-sectional area in each direction of movement and is connected through pipes of small diameter to the operating cylinder of the associated main valve on the one hand and to the fluid reservoir and sump on the other hand.

In a preferred embodiment of the apparatus according to the invention each axially movable pinion or dog clutch is engaged with one toothed member or another in each of two different gear ratios and is connected to a piston movable in a cylinder into two end positions and an intermediate position, the cylinder having connected to it three large diameter pipes of which one leads to the fluid reservoir and the other two are connected to respective hydraulically operated two-position three-way main valves, which two main valves are each connected in addition through large-diameter pipes to the reservoir and sump and uncover a large cross-sectional area in each direction of movement and are controlled by respective electro-magnetic two-position three-way primary valves with small actuating windings connected to the control member, which two primary valves only uncover a small cross-sectional area in each direction of movement and which are connected on the one hand to the operating cylinder of one of the main valves and on the other hand to the reservoir and the sump through small-diameter pipes, the main valves being controlled so that in the intermediate position of the piston two of the pipes leading to the cylinder are connected to the reservoir while the third is connected to the sump whereas in the one end position of the piston all three pipes are connected to the reservoir and in the other end position only one of the pipes is connected to the reservoir and the other two to the sump.

Each cylinder can advantageously have an annular stop which divides the cylinder into a front portion in which moves the first piston connected to the pinion or clutch to be moved, and a rear portion in which moves a second piston which, on engaging the annular stop, has its piston rod projecting so far into the front portion of the cylinder that the first piston, which now engages against the free end of this piston rod, is in its intermediate position in which it is equidistant from the annular stop and from the front end face of the cylinder, the rear portion of the cylinder being at least long enough so that on engagement of the piston against the rear end face of the cylinder the free end of its piston rod is just clear of the front portion of the cylinder and further the effective surface area of the first piston on that face of it which is towards the second piston is greater than its area facing the front end of the cylinder, and furthermore of the three large-diameter pipes leading to the cylinder those two which are connected to a main valve open into the cylinder in or near the rear end face of the cylinder and in or near the annular stop respectively, whilst the third pipe, which is without a main valve, opens into the cylinder in or near its front end face.

An electro-magnetically operated two-position three-way valve can advantageously be connected in the pipes between the reservoir and the primary and main valves and it is connected also to the sump through a further pipe so that in one direction of operation of this last-mentioned valve the reservoir is connected to the pipes leading to the primary and main valves and in the other direction of operation it is the sump that is connected to these pipes.

Preferably the electro-magnetically operated primary valves and the hydraulically operated main valves, at least however the primary valves, are constructed as poppet valves, for example ball valves.

It has been found particularly advantageous for one of the components that is to brought into synchronism at each gear change and which is freely rotatable when the engine is disconnected and the gear is itself disengaged, to be connected to a special device, controlled by electric control means, and acting at will either to accelerate or slow down the component. Preferably this device is in the form of an hydraulic assembly acting as a motor or pump. This assembly could preferably be connected through two pipes to an electromagnetically operated three-position four-way valve which is controlled by the control member and which moreover is connected to the reservoir and the sump and in its first position it puts the said two pipes into communication with the reservoir and the sump respectively, in its second position it cuts off these two connections and connects the said two pipes together, and in its third position it cuts off the connections of the two pipes both to the reservoir and sump and also to each other, and between the two pipes, in parallel with the assembly, there is a pressure relief valve which opens from the exhaust side to the feed side of the assembly.

Alternatively the above-mentioned assembly may advantageously be made up of a separate braking device and separate motor. Preferably the assembly is connected to the auxiliary shaft of a gear-box having a main and auxiliary shaft.

According to a further feature of the invention the friction clutch provided ahead of the gear-box can be operable by an hydraulic actuating cylinder of which the piston is connected to the movable member of the clutch, the clinder being connected to an electro-magnetically operated valve arrangement which is controlled by the electric control member and which moreover is connected to the reservoir and sump and in one position connects the cylinder to the reservoir whilst in the other position it connects the cylinder to the sump. Preferably the valve arrangement comprises an hydraulically operated two-position three-way main valve which uncovers a large cross-sectional area in each end position, and an electro-magnetically operated two-position three-way primary valve which uncovers only a small cross-sectional area in each end position and is connected by a small operating winding to the control member, and main valve being connected on the one hand through a large diameter pipe to the cylinder and on the other hand through large diameter pipes to the reservoir and sump, and the primary valve being connected through small diameter pipes on the one hand to the operating cylinder of the main valve on the other hand to the reservoir and the sump.

The electro-magnetically operated primary valve can preferably be formed as a poppet valve, for example a ball valve and the same applies to the hydraulically operated main valve. Also in the pipe between the clutch-operating cylinder and the valve arrangement or main valve there can be inserted a one-way restriction acting only in a direction away from the cylinder so that its restricting action is only effective when the fluid is flowing from the cylinder to the valve arrangement or main valve but the fluid is unrestricted when it flows in the other direction towards the cylinder.

According to a further advantageous feature of the invention the actuating cylinders for the pinions or dog clutches to be moved at each gear change can be mounted side-by-side on a common housing component which carries the guides and seals for the piston rods and the switches for indicating engagement or disengagement of the gear and which is secured in its turn to a second housing component which is provided with connections leading to the primary and main valve for the actuating cylinders. These two housing components are preferably connected by a common cover. Moreover they may have matching surfaces and bolt holes for mounting them on the gear-box housing. The passages leading to the actuating cylinders can likewise be machined with advantage in the two housing components and, at the mutually engaging surfaces between the cylinders the first and second housing components, can be sealed by inserted sealing rings. For supplying the pressure fluid medium a special connection body can preferably be secured to the side of the second housing component, which body has at least two check valves in the passage leading to the pump, arranged so that the pressure after the first check valve acts both on the reservoir and also on the primary valves and the pressure after the second check valve reaches the main valves.

According to a final characterising feature of the invention two main valves and two primary valves are associated with each actuating cylinder, the main valves being arranged parallel to each other in the lower part of the second housing component adjacent the gear-box housing, while the primary valves are secured in a special recess in the second housing component above the main valves, parallel to the latter and to each other, the recess fitting a recess in the first housing component carrying the switches for indicating the gear position and defining together with the other recess and cover portion a closed space which is filled with oil to prevent the formation of condensed water vapour.

An embodiment of the invention by way of example is described in the following in conjunction with the accompanying drawings, in which.

Figure 1:
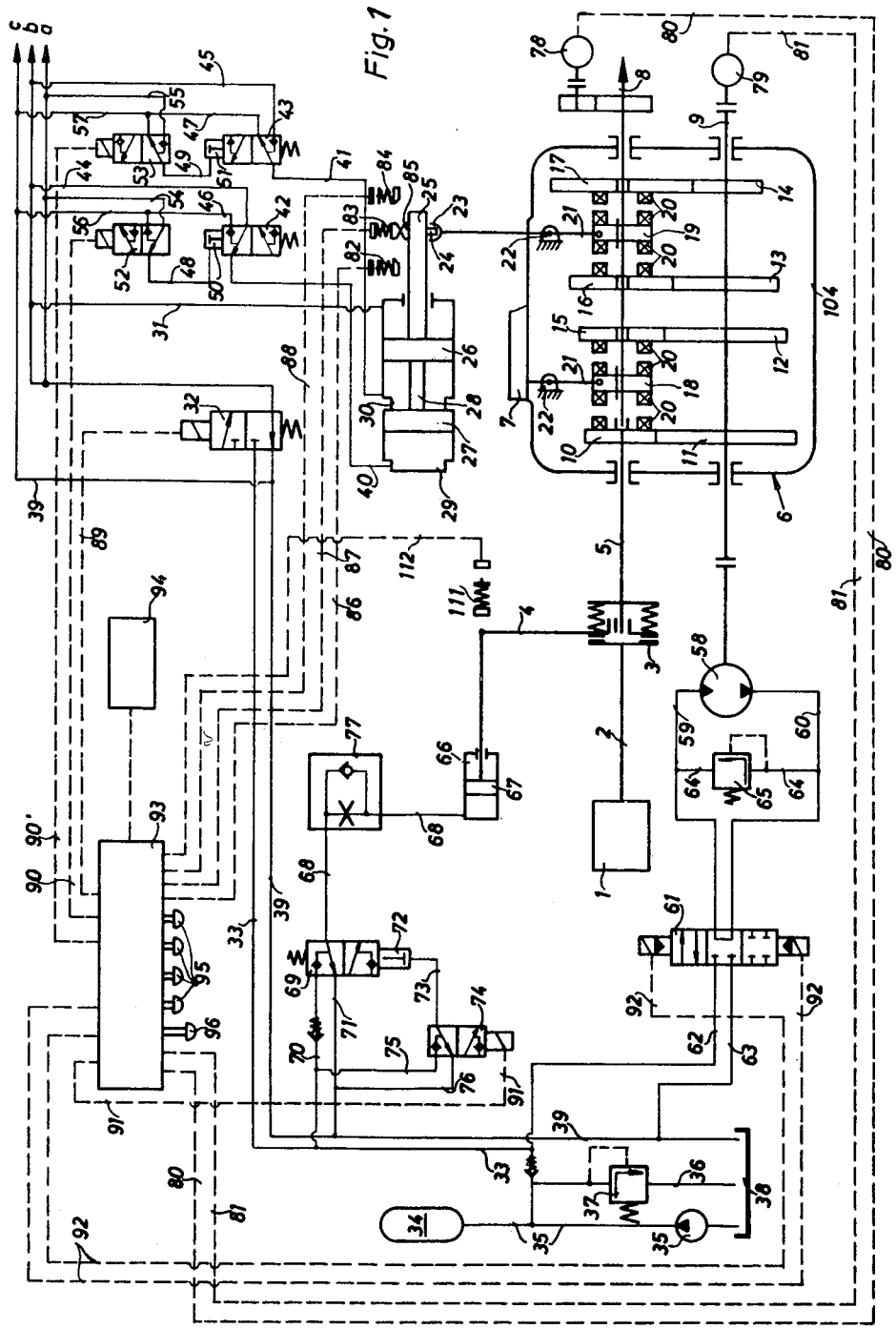
FIG. 1 is a diagrammatic illustration of one embodiment of the apparatus according to the invention for performing gear changes in multi-ratio change-speed gear-boxes.

In the apparatus according to the invention illustrated diagrammatically in FIG. 1 there is shown the equipment suitable for a heavy goods vehicle. The engine 1 of the vehicle is connected through a shaft 2 to a friction clutch 3 of which the moving member 4 is secured to rotate with, but to be axially movable with respect to, the input shaft 5 of the change-speed gearbox 6. The gear-changing mechanism 7, to be explained further, is mounted on the gear-box 6 in place of a cover.

The gear-box 6 is of ordinary construction and has a main shaft 8 and a layshaft 9. The main shaft 8 forms the output shaft connected to the vehicle wheels that are to be driven. It is connected through the layshaft 9 to the input shaft 5. The pinions 10 to 17 and sliding dogs 18 and 19 are provided for this purpose. The shaft 5 carries the pinion 10 and the shaft 9 carries the pinions 11, 12, 13 and 14 which are keyed to it to be fast against rotation and also axially fixed. While the gear wheel 11 on the shaft 9 meshes with the pinion 10 on the shaft 5, the gear wheels 12, 13 and 14 on the layshaft 9 are in constant mesh with the pinions 15, 16 and 17 of the gear-box 6, which pinions are mounted on the main shaft 8 to be axially located but freely rotatable.

In contrast the sliding dogs 18 and 19 are mounted on the main shaft 8 to rotate with it but to be axially slidable on it so that they can be brought into engagement with their dog teeth 20 provided on both faces engaging at will with mating dog teeth on the pinions 10 and 15 or 16 and 17. When the dogs 18 and 19 are in their intermediate position as shown in FIG. 1 then when the shaft 5 is rotating all the gear wheels and pinions 10 to 17 and also the layshaft 9 of the gear-box 7 rotate with it, but not the main shaft 8. This is only caused to rotate with them if the sliding dog 18 or 19 is caused to engage the teeth 20 on the pinion 10 or 15 or 16 or 17. In this way, for a given speed of rotation of the shaft 5, the shaft 8 rotates at different speeds according to which of the pinions 10, 15, 16 or 17 is coupled to it by means of the sliding dog 18 or 19. For a given speed of the shaft 5 the engagement of the dog 19 with the teeth 20 on the pinion 17 produces the lowest speed for the shaft 8, engagement of the dog 19 in the teeth 20 of the pinion 16 produces a higher speed for the shaft 8, engagement of the dog 18 in the teeth 20 of the pinion 15 produces a still higher speed for the shaft 8, and engagement of the dog 18 in the teeth 20 of the pinion 10 produces the highest speed of the shaft 8, equal to the speed of the shaft 5. It will be clear that only one of the two dogs 18 and 19 can be engaged at one time and the other must remain in its central position as shown in FIG. 1.

The axial displacement of the dogs 18 and 19 is effected by means of a respective lever 21 which is mounted to pivot about a fixed point 22. The pivoting movement of each lever 21 is effected hydraulically in the same manner and so we need only explain and illustrate in FIG. 1 the corresponding steps in connection with one of the levers 21 and one of the sliding dogs.

Each lever 21 is provided with a fork 23 at that end which is furthest from the dog 18 or 19. This fork is engaged by the finger 24 on the piston rod 25 of a piston 26 which is guided for axial sliding movement in a cyliner 29 together with a second piston 27 and piston rod 28. The piston 26 is movable into three different positions in a manner now to be described, namely, into the intermediate positon illustrated in FIG. 1, a left-hand end position in which it engages against an annular stop 30 in the cylinder 29, and a right-hand end position in which it engages against the right-hand end face of the cylinder 29. Associated with each of these three positions of the piston 26 are three corresponding positions of the sliding dog 19 connected to it. In the intermediate position of the piston 26 the associated sliding dog 18 or 19 is in its corresponding central, disengaged, position as shown in FIG. 1. In the left-hand end position of the piston 26 the dog 18 or 19 has its teeth 20 engaging the teeth 20 of the pinion 15 or 17 and in the right-hand end position of the piston 6 on the other hand the sliding dog 18 or 19 has its teeth 20 engaging in the teeth 20 on the pinion 10 or 16.

The actuating cylinder 29 is operated hydraulically and accordingly it has a number of connecting pipes which can be put into communication with a source of fluid under pressure or instead with a sump at zero pressure. Thus a pressure fluid pipe 31 opens into the cylinder 20 near that end face through which the piston rod 25 passes. This pipe 31 is connected to one side of an electro-magnetic two-position three-way valve 32 of which the other side is connected through a pipe 33 to a pressure fluid reservoir 34. This reservoir is fed with fluid from the pump 35 and when the reservoir 34 is full the excess oil returns through the pipe 36 and relief valve 37 to the sump 38.

In addition the said other side of the valve 32 is connected through a return pipe 39 to the sump 38. There are thus three fluid connections leading from the valve 32.

In addition to the pipe 31 two further pipes 40 and 41 are connected to the cylinder 29. Whereas the pipe 40 opens into the rear end face of the cylinder 29, opposite that end through which the piston rod 25 passes, the pipe 41 enters the cylinder 29 in the neighbourhood of the annular stop 30. Pipes 40, 41 are each connected to a respective hydraulically actuated two-position three-way main valve 42 or 43, these valves being connected through respective pipes 44 and 45, together with the pipe 31, to the valve 32 mentioned earlier and through pipes 46 and 47 to the return pipe 39 which leads to the sump 38. The two main valves 42, 43 are each operated by a respective electro-magnetic two-position three-way primary valve 52 or 53 through a respective pipe 48 or 49 which is connected to the operating cylinder 50 or 51 of main valve 42 or 43.

In addition to the pipe 48 or 49 each primary valve 52 or 53 has in addition a respective pipe 54 or 55 leading to the valve 32 and a pipe 56 or 57 connected to the return pipe 39. In order to shift the pistons 26 and 27 in the cylinder 29 in a sudden manner and accordingly to allow the necessary quantityy of fluid to flow into or out of the corresponding end of the cylinder 29 extremely rapidly, the pipes 31, 40, 41, 44, 45, 46, 47 and 33 and 39 are made of appropriately large inside diameter and furthermore the valves 32, 42 and 43 are constructed so that they likewise uncover correspondingly large cross-sectional area in each direction of movement. In addition, for sudden shifting of the piston 26 in the cylinder 29 on receipt of an appropriate command from a control member, to be described later, it is arranged that a large-volume main valve 42 or 43 is associated with each of the pipes 40 and 41 and is controlled hydraulically by a low-volume electromagnetic primary valve 52 or 53.

The valves 52 and 53 require only a low force for their operation and so that their electrical windings can be small and the magnetic fields which they have to build up are of low strength and can be built up rapidly. Operation of the valves 52 and 53 is accompanied almost simultaneously by operation of the associated valve 42 or 43 as the hydraulic connection between the valves 42 and 52 or 43 and 53 allows virtually no delay.

Finally, further to ensure rapid switching of the pipes 40, 41 to the valve 32 or to the return pipe 39 it is arranged that the valves 42, 43, 52, 53 are constructed as ball valves having no positive overlap travel of the closure member and accordingly a very short working stroke. In orthodox valves having central rotationally symmetrical control slides or spools and annular pressure spaces arranged around them, a positive overlap of the pressure chambers by the spool is necessary in order to keep the loss of fluid by leakage as low as possible. Therefore on each operation of the valve the amount of this overlap must first be taken up before the spool uncovers a free passage. This needs extra time and furthermore the magnet for the valve must be correspondingly powerful because of the longer stroke, i.e. its winding will have increased inductance. All these drawbacks are eliminated by the use of the ball valves 42, 43, 52, 53.

The layshaft 9 in the gear-box 6 is connected to an hydraulic assembly 58 which can act as a motor or a pump at will. It is connected through a fluid supply pipe 59 and a return pipe 60 to an electro-magnetic three-position four-way valve 61, which is further connected through two pipes 62 and 63, to the pressure fluid reservoir 34 and the zero-pressure sump 38. In one operative position of the valve 61 the pipes 59, 60, 62 and 63 are shut off and so the hydraulic assembly 58 operates as a pump which delivers fluid to the pipe 60 and from there through a further pipe 64 in which there is a pressure relief valve 65 leading to the pipe 59 from which the assembly 58 draws its fluid. In this way the assembly 58 has to maintain continuously the pressure necessary to overcome the closing pressure to which the relief valve 65 is set and so it has a braking effect on the layshaft 9 of the gear-box 6.

In the second position of the valve 61 the pipes 62 and 63 are shut off as before but the pipes 59 and 60 are now connected to each other so that the pipe 64 and its appropriate relief valve 65 are by-passed. Thus the assembly 58 driven by the layshaft 9 works as before as a pump but without having to deliver fluid against any pressure in the pipes 60 and 59 and therefore exerting virtually no braking effect on the layshaft 9. In its third position the valve 61 connects the pipe 59 to pipe 62 and the pipe 60 to the pipe 63 so that the hydraulic assembly 58 is fed with fluid from the reservoir 34 and can act as a motor which drives the layshaft 9.

To operate the friction clutch 3 of the heavy goods vehicle provided with the installation of FIG. 1 there is an actuating cylinder 66 on which the piston 67 is connected to the movable member 4 of the clutch 3. The cylinder 66 is in communication through a pipe 68 with an hydraulically operated two-position three-way valve 69 which is connected through a pipe 70 to the reservoir 34 and through a pipe 71 to the sump 38. The operating cylinder 72 of the valve 69 is connected through a pipe 73 to an electro-magnetically operated two-position three-way primary valve 74 which is further connected through pipes 75 and 76 likewise to the reservoir 34 and the sump 38. In order to ensure rapid operation of the cylinder 66 by the necessary volume of fluid, the pipes 68 and 70 have a correspondingly large inside diameter and furthermore the valve 69 is arranged so that it uncovers a correspondingly large cross-sectional area, at least in that position in which it connects the pipes 68 and 70. For the reasons already explained above in connection with the actuation of the cylinder 29, we do not provide an electro-magnetic main valve 69 but instead we make the main valve 69 as an hydraulically operated valve which is controlled by the primary valve 74 which is of low volume and is electro-magnetically operated. Again for the reasons given above the valves 69 and 74 are constructed as ball valves.

In order to ensure rapid disengagement of the clutch 3 but slow engagement a restriction 77 including a one-way check valve is incorporated in the pipe 68 providing a large cross-sectional area in the direction of flow towards the cylinder 66 but a restricted cross-section in the opposite direction.

A tachometer 78 is driven by the main shaft 8 of the gear-box and a tachometer 79 is driven by the layshaft 9 and these have electric connections 80 and 81 leading from them. Electric switches 82, 83 and 84 are also provided, closed by a control cam 85 on the piston rod 25. The switches 82, 83 and 84 are arranged so that they are closed by the cam 85 when the piston 26 is in its left-hand position, in its intermediate position as shown in FIG. 1, and in its right-hand position respectively, and thus when the sliding dog 19 is connected to the pinion 17 or is in its central idling position shown in FIG. 1 or is coupled to the pinion 16. Electric leads 86, 87 and 88 are joined to the switches 82, 83, 84.

The winding of the solenoid of the valve 32 is energised through an electric connection 89. The windings of the solenoids of the primary valves 52 and 53 are energised through leads 90 and 90'. For the same purpose the windings of the solenoids of the valve 74 and the winding of the solenoid of the valve 61 are connected to electric leads 91 and 92.

All the electric leads 80, 81 and 86 to 92 are connected to an electric or electronic control member 93 to which a device 94 for visual indication of the gear ratio engaged in the four-speed gear-box 6 is connected. The control member 93 (similar to that disclosed in U.S. Pat. NO. 3,530,668) of which the construction is not explained further (nor is that of the visual indicator 94) is provided with four push buttons 95, operation of which pre-selects the ratio to be engaged in the gear-box 6. The button 96 serves to set in motion the gear-changing sequence by which the preselected ratio is automatically engaged. This is performed in the manner now to be explained.

It will be assumed that the vehicle provided with the mechanism shown in FIG. 1 is running in first gear and is to be changed up into second gear. In first gear the shaft 8 driving the rear axle of the vehicle is driven from the layshaft 9 through the gear pair 17, 14 and the layshaft is driven from the input shaft 5 through the gear pair 10, 11. The shaft 5 is driven from the engine 1 as the clutch 3 is in engagement. The hydraulic assembly 58 has neither a braking nor an accelerating action on the shaft 9 as the valve 61 is in its second or intermediate position in which the pipes 62 and 63 are shut off and the pipes 59 and 69 are connected together. The cylinder 66 and also the cylinders 29 are both without pressure as the valve 32 is in the position shown in FIG. 1 and so the pipe 31 is connected to the return pipe 39 leading to the sump 38 and so all the pipes in which the valves 42, 43, 52 and 53 are connected are at zero pressure.

Depression of the pre-selector button 95 that is associated with second gear prepares the control member 93 for engaging second gear. In particular within the control member 93 the comparator which determines the condition of synchronism of those components in the gear-box which are to be brought into engagement in a gear change is set to the ratio of the selected gear, in the present case therefore to the ratio determined by the gear pair, 13, 16. In addition there is selected within the control member 93 which of the primary valves 52 and 53 needs to be energised.

When he wants to engage the pre-selected second gear all the driver of the vehicle has to do is to press the button 96 which can for example take the form of that foot pedal which would normally serve for actuating the clutch of the vehicle. This is particularly convenient as then the driver of the vehicle has to learn virtually no new actions for performing a gear change but on the contrary similarity to the gear changing sequence in vehicles with orthodox gear-boxes remains. On operation of the button 96 the valves 74 and 32 are energised. The quick acting valve 74 immediately connects the operating cylinder 72 of the valve 69 to the reservoir 34 so that the valve 69 is operated almost simultaneously with operation of the valve 74 so that the cylinder 66 is likewise put in communication with the fluid reservoir 34. The piston 67 is acted on suddenly by such a quantity of fluid that the clutch 3 is rapidly disengaged, disconnecting the engine 1 from the input shaft 5 of the gear-box.

At the same time actuation of the valve 32 causes the cylinder 29 to be connected to the reservoir 34 through the pipe 40 so that the piston 26 moves from its left-hand end position to the intermediate position shown in FIG. 1 and the teeth 20 on the sliding dog 19 are disengaged from the teeth 20 on the pinion 17, with the dog 19 taking up its central position as likewise shown in FIG. 1. The valves 52, 53 and 42, 43 are constructed and connected so that when the leads 90 and 91 are without power, accordingly the valves 52 and 53 are not energised, the operating cylinder 50 of the valve 42 is under pressure and the cylinder 51 of the valve 43 is not under pressure, and the valve 42 connects the pipe 40 to the reservoir 34 through the pipe 44 and the valve 32, and the pipe 33, while the valve 43 connects the pipe 41 to the sump 38 through the pipe 47 and the return pipe 39. Thus the pipes 31 and 40 are under pressure, whilst the pipe 41 is not. The piston 27 is moved towards the annular stop 30, and urged up against it, by the fluid passing through the pipe 40. By means of its piston rod 28 it carries with it the piston 26 which is acted on at its piston rod face by the fluid from the pipe 31. The surface area of the piston 26 on which the pressure of the fluid fed through the pipe 31 acts is that much smaller than the surface area of the piston 27 on which the pressure of the fluid fed through the pipe 40 acts on the piston 27 so that the above-mentioned sudden displacement of the piston 26 occurs from its left-hand end position is the intermediate position shown in FIG. 1.

The attainment of this intermediate position of the piston 26 and thereby of the sliding dog 19 is signalled to the control member 93 by the switch 83 closed by the cam 85 on the piston rod 25. The receipt of this signal from the switch 83 immediately brings the hydraulic assembly 58 into action as a brake, i.e. it brings the valve 61 into its lowermost position shown in FIG. 1, in which the pipes 59, 60, 62 and 63 are all shut off and the assembly 58 works as a pump against the pressure set in the relief valve 65, this pump being driven by the layshaft 9 of the gear-box 6, thereby rapidly reducing the speed of this shaft. As soon as the pinion 16 and the sliding dog 19 (and thereby the main shaft 8) are rotating at the same speed the comparator in the control member 93 gives the signal for the teeth 20 on the sliding dog 19 to be brought into engagement with the teeth 20 on the pinion 16, i.e. the valve 53 is energised from the control member through the lead 90'. The primary valve 53 is energised with virtually no delay and puts the operating cylinder 51 of the main valve into communication with the reservoir 34 through the pipes 49 and 55 and the valve 32 and the pipe 33. The cylinder 51 of the valve 43 is therefore immediately put under pressure and the valve 43 connects the pipe 41, leading to the cylinder 29, with the pipe 45 which is in communication through the valve 32 and the pipe 33 with the reservoir 34. The piston 26 is immediately and suddenly shifted to its right-hand end position and equally rapidly the sliding dog 19 engages with its teeth 20 in the teeth 20 of the pinion 16. It will be understood that simultaneously with the energisation of the valve 53, the valve 61 is shifted to the position shown in FIG. 1, so that the hydraulic assembly 58 no longer exerts any braking action on the layshaft 9 of the gear-box 6.

Despite the fact that the same pressure acts on both sides of the piston 26 the piston is displaced rapidly to the right because its left-hand face has a correspondingly larger surface area than the right-hand face. The attainment of the right-hand end position of the piston 26 is signalled to the control member 93 by the switch 84 which is closed by the cam 85 on the piston rod 25.

On receipt of the signal coming from the switch 84, the valves 32 and 74 are simultaneously switched off, the valve 32 being transferred from the reservoir 34 to the sump 38 and the pipe 73 leading to the actuating cylinder 72 of the valve 69 is also connected to the sump 38, so that the valve 69 is switched over and the pipe 68 is likewise connected to the sump 38. Because of the one-way restriction 77 in the pipe 68 the piston 67 in the cylinder 66 only returns to its starting position slowly and so the clutch 3 engages slowly and the engine 1 is coupled to the input shaft 5 of the gear-box in a smooth and gentle manner. The digit 2 appears in the indicator 94 showing what gear ratio is engaged in the gear-box 6.

Furthermore, after the arrival of the signal from the switch 84 the primary valves 52 and 53 and accordingly the corresponding main valves 42 and 43 are switched back with a pre-determined delay in relation to the switching-over of the valve 32 and are put in communication with the return pipe 39 and the sump 38.

The gear-changingg sequence described above takes place, from operation of the push button 96 to closing of the switch 84, in about 250 msec. The engagement of the teeth 20 on the sliding dog 19 and the teeth 20 on the pinion 16 occurs in about 35 msec. This extremely short period of time extends between the energisation of the electric lead 90' and thereby of the primary valve 53 and the operation of the switch 84, i.e. the completion of the engagement of the teeth 20 in the sliding dog 19 and the pinion 16.

The change down from a higher to a lower ratio, for example from third to first gear, takes place in the same short period of time. Again this is started by depression of the push button 95 corresponding to first gear, which pre-sets the electric control member 93. Then follows operation of the initiating button 96 so that the valve 32 and the pipe 31 as well as the primary valves 52, 53 and the main valves 42, 43 not only of the cylinder 29 shown in FIG. 1 but also of a second such cylinder 29, not shown, are connected to the pipe 33 and thereby to the pressure fluid reservoir 34, and in addition the clutch 3 is disengaged suddenly in the manner described above. The second cylinder 29, of which the piston 26 is in its left-hand end position against the annular stop 30, is shifted suddenly to its intermediate position in the manner described, in which position the first cylinder 29 already is, as shown in FIG. 1. Thereby the sliding dog 18 has its teeth 20 disengaged from the teeth 20 of the pinion 15 and it takes up its central position shown in FIG. 1. A second switch 83 signals this fact to the control member 93.

The control member 93 then causes actuation of the valve 61 into its position indicated by the upper symbol in FIG. 1, in which the pipe 62 is connected to the pipe 59 and the pipe 60 is connected to the pipe 63. Fluid under pressure flows from the reservoir 34 through the hydraulic assembly 58 and from there back to the sump 38. The assembly 58 operates as a motor and speeds up the layshaft 9 of the gear-box. As soon as the comparator in the control member 93 detects a condition of synchronism between the pinion 17 and the sliding dog 19 (and thereby of the main shaft 8 of the gear-box) and sends out an electric signal, the piston 26 of the first cylinder 29, shown in FIG. 1, is suddenly displaced into its left-hand end position against the stop 30, so that the teeth 20 of the sliding dog 19 engage the teeth 20 on the pinion 17. The cam 85 on the piston rod 25 then closes the switch 82 so that the control member 93 initiates the switching over of the valve 61 into its intermediate position shown in FIG. 1 in which the pipes 62 and 63 are closed off and the pipes 59 and 60 are connected together, initiates switching over of the valve 32 into the lower position shown in FIG. 1, and which initiates the delayed switching over of the valve 52, and thereby of the valve 42, into the position likewise shown in FIG. 1, so that the two pipes 31 and all the primary valves 52, 53 and all the main valves 42 and 43 are at zero pressure, being connected to the sump 38.

The sudden movement of the piston 26 into its left-hand end position is effected by the control member 93 energising the primary valve 52 through the electric lead 90 so that the valve 52 changes over to the position shown by the upper symbol in FIG. 1 and puts the actuating cylinder 50 of the main valve 42 into communication with the return pipe 39, and thereby with the sump 38, through pipes 48, 56. This brings the main valve 42 into the position shown by the lower symbol in FIG. 1, in which the pipe 40 is put in communication through pipe 46 with the return pipe 39 and thereby with the sump 38. The fluid present behind the piston 27 can thus escape suddenly so that the fluid fed through the pipe 31 to the other side of the piston 26 displaces the piston 26 together with the piston 27 suddenly to the left until the piston 26 comes up against the annular stop 30.

As already made clear by what has been said above, it will be evident that the gear-box 6 can be changed from any ratio in which it is engaged, that is to say from each effective gear ratio, into the neutral position shown in FIG. 1. Thus after operation of the appropriate pre-selector button 95 and the initiating button 96, the sliding dog 18 or 19 that is already engaged is brought into its intermediate position shown in FIG. 1 without the speed comparison and without the engagement of one of the dogs 18 or 19 with the teeth 20 of one of the pinions 10, 15, 16 or 17 taken place, and without the hydraulic assembly 58 having to be brought into action.

Starting off from rest also is performed in the manner described above. The gear-box 16 is initially in its neutral position as shown, with the shafts 5 and 9 rotating at speeds dependent respectively on the engine speed and on the speed of the shaft 5 and the gear ratio of the pair 10, 11, whilst the shaft 8 and the sliding dogs 18 and 19 are stationary. Each of the pinions 15, 16 and 17 rotates at the speed corresponding to the speed of the layshaft 9 and the gear ratio of the pair 12, 15 or 13, 16 or 14, 17. First gear is now selected by operation of the appropriate button 95 and the gear-changing sequence is initiated by operation of the button 96. This first disengages the clutch 3 and switches over the valve 32 so that both cylinders 29 have fluid under pressure fed to them through the respective pipes 40, 31. As both switches 83 are closed, the hydraulic assemlby 58 is started up. Because the comparator and the control member 93 ascertains that the shaft 8 and thus the sliding dog 10 is at rest whereas the shaft 9 is rotating, and therefore that to achieve synchronism between the dog 19 and and the pinion 17 the latter must be brought to a halt, the assembly 58 is connected to act as a brake in that the control member 93 shifts the valve 61 to the position shown by the lowest symbol in FIG. 1, in which the assembly 58 pumps fluid against the opening pressure of the relief valve 65. As soon as the comparator in the control apparatus 93 signals that the sliding dog 19 and the pinion 17 are stationary, the piston 26 in the cylinder 29 is shifted to its left-hand end position in the manner described already above, so that the teeth 20 on the sliding dog 19 engage the teeth 20 on the pinion 17. The completion of this engagement is signalled to the control member 93 by the switch 82 which is closed by the cam 85. The slow engagement of the clutch 3 then takes place, as well as the changing over of the valve 32. The valve 61 is already changed back to its central position shown in FIG. 1 by the control member 93 on initiation of the displacement of the piston 26.

The cylinder 29 shown in FIG. 1 together with its associated valves 42, 43, 52 and 53, switches 82, 83 and 84 and lever 21, together with the second cylinder 29, already mentioned above but not illustrated, together with its assosiated valves 42, 43 52 and 53 and switches 82, 83 and 84 and lever 21 are brought together in a constructional unit 7 of which the form will now be described with reference to FIGS. 2 to 4. The arrows a to c in FIG. 1 signify that the appropriate associated components of the further cylinder 29 are connected to the pipes in question. Leads 86 to 88 of the switches 82 to 84 and the leads 90, 90' of the second cylinder 29, not shown, are likewise not illustrated in FIG. 1.

In order to make absolutely sure that, in a gear-changing sequence, the sliding dog 18 or 19 that was prevously engaged is only disconnected from the pinion 10, 15, 16 or 19 when the clutch 3 is disengaged, there is provided a switch 111 connected through a lead 112 to the control member 93. The switch 111 is closed by the actuating lever 4 of the clutch or by the rod of the piston 67 when the friction clutch 3 is disengaged. Only on receipt of the electric signal in the control member 93 is the valve 32 switched over.

With the arrangement according to the invention shown in FIG. 1 such a rapid gear-changing sequence makes it possible for the first time for the engine 1 to be able to run always in its best speed range in which it delivers maximum torque. Experiments have shown that the device according to the invention even in travel of fully laden goods vehicles of maximum weight (for example 32 tons total weight of vehicle with trailer) through mountainous country, permits gear-changing without difficulty. Previously this was not possible because the gear-changing operation took up so much time that, while the vehicle was running idle during the gear-change, it slowed down too much to be able to be driven in the selected higher gear at an engine speed lying in the range of maximum torque. After engagement of the higher ratio and re-engagement of the clutch the engine was thin running at a speed associated with such a reduced torque that it was no longer able to drive the vehicle and the engine stalled.

Moreover it has been found that the arrangement according to the invention allows completely shock-free gear-changes. The change from one ratio to the next is not detectable. This not only spares all the components of the vehicle but also its occupants and its load.

The apparatus of FIG. 1 can be modified in numerous ways. For example the gear-box 6 can equally well be constructed as a multi-shaft box with more that two shafts or it can be constructed as an epicyclic box. Instead of sliding dogs 18, 19 provided with dog teeth on both faces, one could provide driving keys which, in one position, connect the pinion associated with them to the associated shaft whereas in their other positions the pinion is free of the shaft. Also it is possible, instead of the sliding dogs 18, 19, to mount the pinions 15, 16 and 17 on the shaft 8 so that they are keyed against relative rotation but are axially slidable, or alternatively these pinions can be rigidly keyed to it and for the gear wheels 12, 13 and 14 to be axially slidable on the shaft 9 but keyed to it for rotation with it.

It has already been stated that the button 96 for initiating a gear change can be in the form of a pedal which, in a vehicle equipped with the arrangement according to FIG. 1, is put in place of the normal clutch pedal. In order to obtain further as great similarity as possible for the vehicle to an orthodox vehicle in the matter of operation and equipment of the actuating levers, instead of the pre-selector buttons 95 we could provide an orthodox gear lever on the floor of the driver's cab or below the steering wheel, operation of which in the orthodox manner results in the same pre-selection as occurs on operation of one of the push buttons 95.

The arrangement shown in FIG. 1 could also be constructed so that instead of the pre-selection and initiation of a gear change being performed by hand these steps could be performed automatically in accordance with the vehicle speed and load, thus resulting in a fully automatic gear-box. For this purpose the electric control member 93 is supplied with an indication of the vehicle speed and engine speed and accelerator pedal position.

The pressure fluid reservoir 34 can be eliminated when a pump 35 of sufficiently large power and volume is employed. However use of a reservoir 34 is preferred as this allows a smaller pump 35 to be used and in addition fluid is available even when the pump 35 is stationary. Moreover the reservoir 34 can be one which is already provided on the vehicle for other purposes.

The speed-indicating 78, 79 are preferably tachogenerators of which the output voltages or frequencies are compared with one another in the electric or electronic control member 93 according to the gear ratio that has been pre-selected. In this way one can get away with only two speed indicators 78, 79 and it is not necessary to provide each of the pinions 10, 15, 16 and 17 with an individual indicator of which the output signal would be compared with the output signals of the speed indicator 78 of the sliding dogs 18, 19.

In the gear-change according to the invention it is also of particular significance that only relatively small masses have to be slowed down or accelerated to obtain synchronism of those components which are to be brought into engagement, these masses being the layshaft 9 with its gear wheels 11, 12, 13 and 14 and the pinions 10, 15, 16 and 17 which mesh with them, and the shaft 5 to which the pinion 10 is secured. This allows extremely rapid change of speed of these components to be achieved with the aid of a specially provided hydraulic assembly 58 which can act at will as a motor or a brake. Instead of the convertible hydraulic motor 58 one could also use a convertible electric motor, a convertible exhaust gas-turbine or a convertible fly-wheel motor. Moreover it is also possible to employ motors which are not convertible, which must then be combined with a braking device of known construction.

The hydraulic components 66, 69, 74 and 77 allow extremely rapid disengagement of the clutch 3 and engagement of it which is as rapid as can be permitted by the attainment of smooth take-up of the engine 1 with the shaft 5. This likewise leads to a reduction in the over all gear-changing time. In place of the restriction 77 one could insert in the shaft 2 between the engine 1 and the clutch 3 an hydraulic torque converter or an hydraulic coupling.

The clutch 3 could be operated directly by the driver by means of a clutch pedal in an orthodox manner in addition to or instead of the operation, shown in FIG. 1 and described above, by the control member 93. In the first case a change-over valve is inserted in the pipe 68 between the valve 69 and the restriction 77 and it connects the valve 69 or a cylinder operated by the clutch pedal at will to the restriction 77.

Figure 2:
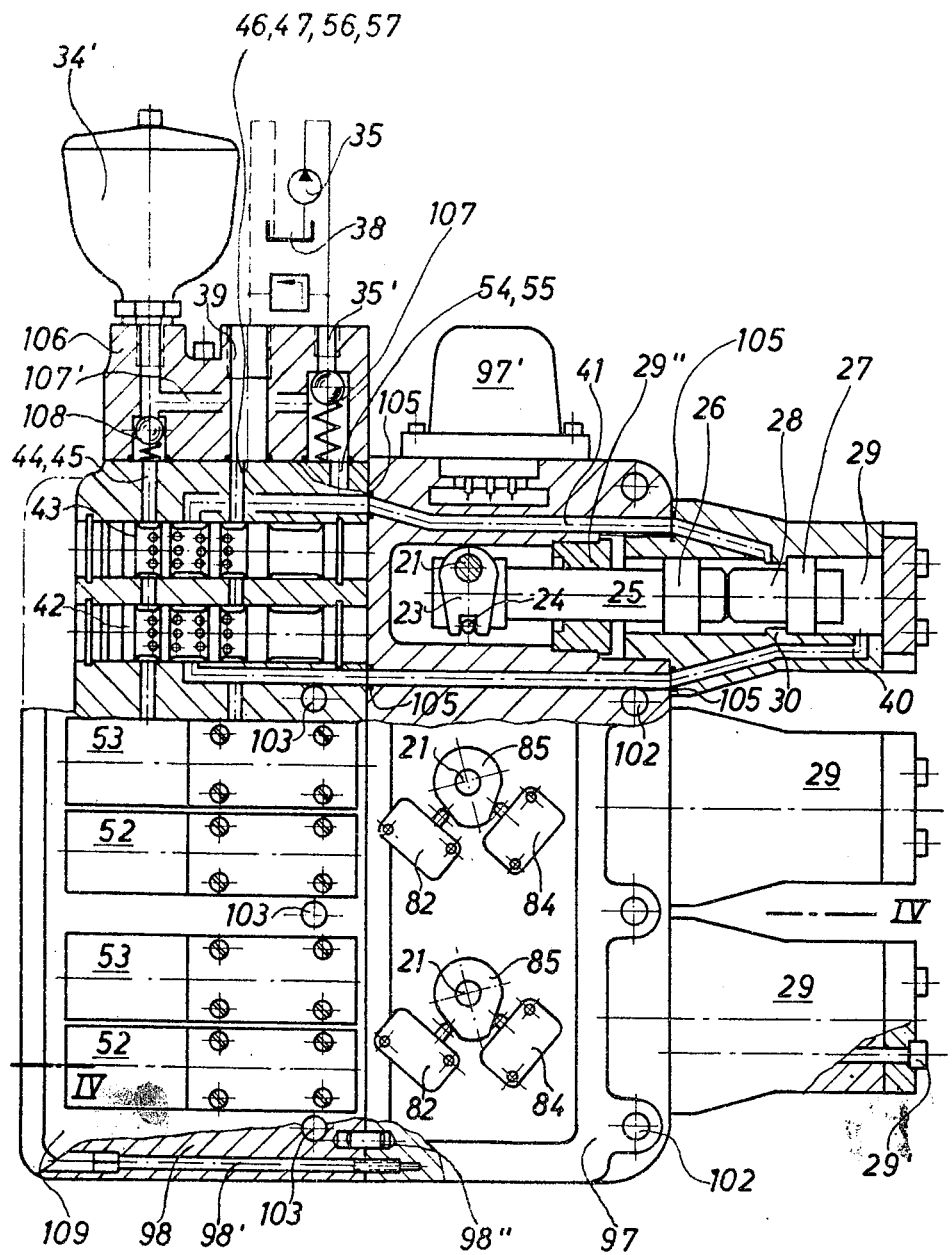
FIG. 2 is a plan view of a partially cut away component of the apparatus of FIG. 1.
Figure 3:
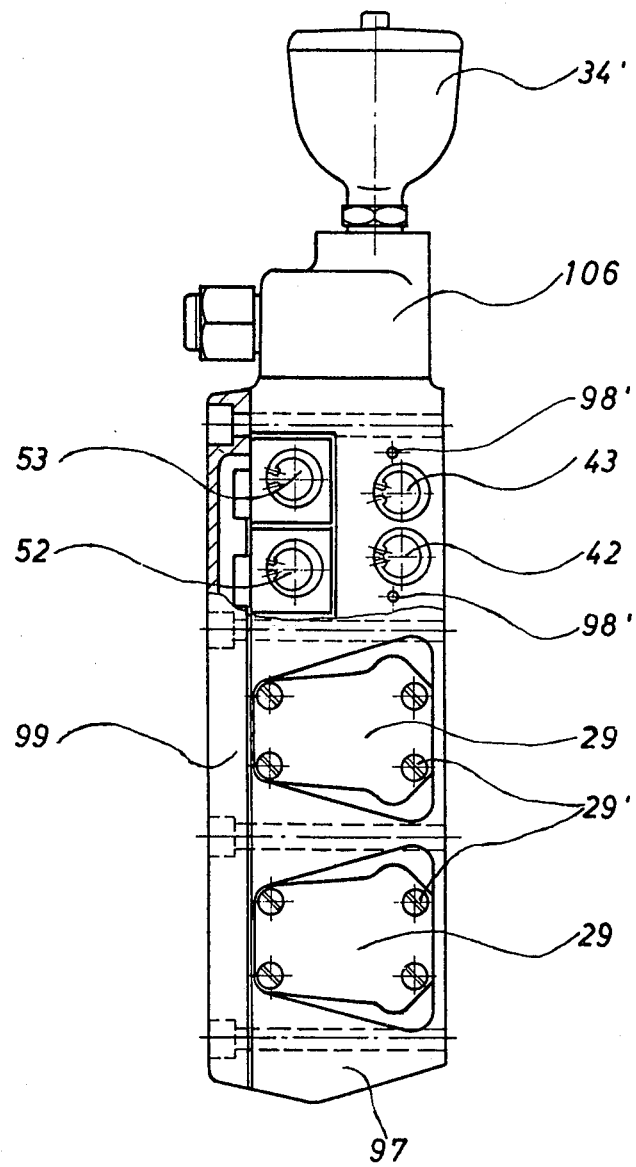
FIG. 3 shows the component of FIG. 2 in end elevation looking from the right.
Figure 4:
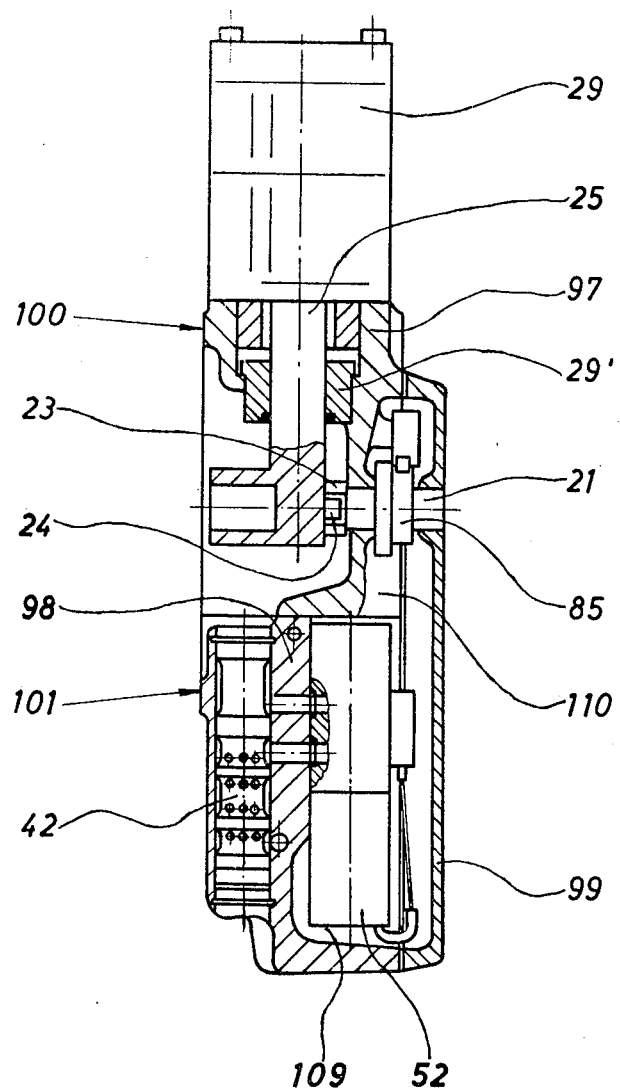
FIG. 4 shows a section along the line IV-IV in FIG. 2.

In FIGS. 2 to 4 there is illustrated a preferred embodiment of a gear-changing arrangement 7 for a six-speed gear-box. The same parts are provided with the same reference numerals as in FIG. 1. Apart from the fact that the device shown in FIGS. 2 to 4 has three actuating cylinders 29, each with two primary valves 52, 53 and two main valves 42, 43, it is distinguished from the device 7 of FIG. 1 further in that it is provided with its own pressure fluid reservoir 34' and accordingly it is connected to the pump 35 and the sump 38 without the interposition of the valve 32 of FIG. 1, so that the device is also under pressure when no gear-changing operation is in progress. The provision of a valve 32 is preferred and in the device of FIGS. 2 to 4 it can be mounted in the same manner as described with reference to the valves 42, 43 or 52, 53 with the valve 32 between the pipe 107' (FIG. 2) and the valve 108 (FIG. 2) still to be described, which valve 108 acts to reduce pressure of flow away from the pipe 107' but allows the fluid to flow unhindered in the opposite direction. The pipe 54, 55 (FIG. 2) is then obviously not connected to the check valve 107 to be described later, but extends away from the valve 32 in parallel with the valve 108, the valve 32 being also connected to the return pipe 39. Where no differences in pressure arise in the pipes 44, 45 and 54, 55 (FIG. 2) the valve 108 can be omitted.

In the construction shown in FIGS. 2 to 4 the three actuating cylinders 29 are mounted side-by-side in bores in a housing component 97 and are each secured by four screws 29'. The piston rods 25 project through a guiding and sealing member 29'' and are connected through a fork 23 to an actuating shaft 21 mounted for rotation in the housing portion 97. The shafts 21 each carry a cam 85 for operating microswitches 82, 84 for signalling engagement of a gear and a switch 83 (not shown) for signalling the neutral position. A terminal box 97' is secured to the side of the housing portion 97 for the connection of the electric leads 86, 87, 88 or microswitches 82, 83, 84 and the leads 90, 90'.

The housing portion 97 is secured to a further housing portion 98 by screws 98' and locating dowel 98'', this portion 98 contains the main valves 42, 43 and the primary control valves 52, 53 of which there are two associated with each actuating cylinder 29. The main valves 42, 43 are mounted side-by-side in parallel bores in the portion 98, whilst the electro-magnetically operated primary control valves 52, 53 have their own housing secured in the portion 98 by screws.

Both housing portions 97 and 98 have a common cover 99 and they are provided in addition with a machined surfaces 100, 101 and bores 102, 103 for mounting them on the gear-box housing 104. Fluid connections between the main valves 42, 43 and the cylinders 29 and between the main valves 42, 43 and the primary valves 52, 53 are formed in the housing portions 97 and 98 and in the cylinder 29. Sealing rings 105 are provided in the mating surfaces of the housings.

A connection block 106 is secured to the side of the housing portion 98 by screws. The block 106 has bores in its outer face for connecting the return pipe 39 and the pipe 35' coming from the pump 35 and it also carries a pressure fluid reservoir 34'. Opening into the co-operating surface of the housing portion 98 are the connections for the passages 54, 55 leading to the primary valves 52, 53, for the passage 44, 45 leading to the main valves 42, 43 and for the return passage 46, 47, 56, 57 for the valves 42, 43, 52, 53. Two check valves are provided in the connection block 106. The first of these 107, prevents the reservoir 34' discharging into the pipe 35'. The second check valve 108 maintains the pressure in the pipe 54, 55 a few atmospheres below the pressure level in the pipe 44, 45. The fluid can flow unchecked from the reservoir 34' through the passage 54, 55 to the primary valves 52, 53.

As shown in detail in FIG. 4, the primary valves 52, 53 are secured in a specially provided recess 109 in the housing portion 98 above the main valves 42, 43, parallel to these and to each other, the recess 109 mating with a recess 110 in the first housing portion 97 which carries the switches 82, 84 and forming, together with the other recess and with the cover 99, a closed chamber which is filled with oil to prevent the formation of moisture by condensation.

The arrangement according to FIGS. 2 to 4 is secured on the gear-box housing 104 (FIG. 1) in place of the whole of or of only part of the gear-box cover and the main pipes 39, 35' are connected up. No further alteration of pipework is necessary as all the other connections are formed within the housing portions 97, 98 and the cylinders 29. The assembly of the equipment can with advantage be broken down into sub-assemblies in that housing portion 97 with the cylinders 29 and the housing portion 98 are pre-assembled and tested in separate groups and then the final assembly only comprises screwing on the two portions 97 and 98.

The extremely rapid operation of the apparatus 7 of FIG. 1 or the actuating arrangement 66, 69, 74 and 77 by the electric control member 93 on receipt of a command is achieved by the combination of two steps, namely the provision of a electro-magnetically operated two-position three-way valve which only has a small cross-section in each operative position and an hydraulic two-position three-way valve which is controlled by this magnetic valve and which uncovers a large cross-sectional area in each operative position, there being such an arrangement for each of the fluid pipes to be controlled, combined with the fact that at least the magnetic valves, and preferably also the hydraulic valves actuated by them, are formed as poppet valves. The magnetic valves can be made extremely small. Their correspondingly small windings accordingly have only small inductance and so only a very short time is needed for the build-up of the magnetic field. As the main valves controlled by the magnetic valves are operated hydraulically and as there is only a short pipe connection between each magnetic valve and its associated main valve, these main valves operate almost simultaneously with the associated magnetic valves. If, in place of a magnetic valve followed by an hydraulic valve, each of the pipes to be controlled were to be provided with a large electro-magnetically operated valve, these must have correspondingly large magnets appropriate to the large volume of flow and these magnets must have windings of correspondingly large inductance. The build-up of the magnetic field necessary to execute the movement would take up a substantial time and in fact, in comparison with the arrangement according to the invention with a magnetic valve followed by an hydraulic valve, a change-over time four or five times as long could not be bettered.

A further reduction in the actual change-over time is achieved by making the valves in question in the form of poppet valves. In orthodox valves with central rotationally symmetrical control slides or spools and with annular spaces arranged around these spools, it is necessary to provide positive overlap of the pressure spaces by the spool in order to keep the loss by leakage as low as possible. Accordingly, on each operation, the spool must first take up the travel represented by this overlap before it starts to uncover a free passage in the one direction or the other. This requires additional time and furthermore the magnet which actuates the valve must be correspondingly more powerful to match the longer stroke and it must be provided with a winding of correspondingly large inductance. In contrast to these, poppet valves have no positive overlap by the closure member and they have a correspondingly shorter working stroke. Their magnets can therefore have smaller windings of lower inductance than the above-mentioned slide valves. All this results in a substantial further reduction in the operating time.

The provision of the valve 32 allows the possibility of leaving the actuating arrangement 7 at zero pressure except when a gear-change operation is to be performed. This leaves the entire operating link work unloaded and reduces the wear on the actuating forks and other components. As is known in itself, the gear-box 6 can be provided with detents into which the sliding dogs 18 and 19 snap in their three operative positions (engaging the pinion 10 or 16, neutral intermediate position, and engaging the pinion 15 or 17) so that the sliding dog 18 or 19 is retained resiliently in each of these positions.

The invention can be put to use not only in heavy goods vehicles but also in all machines, installations, devices and apparatus, as well as vehicles, in which gear-boxes are provided. It can be used with particular advantage in machine tools.

We claim:

1. In an apparatus comprising a gear-box having driven members, driving members and members to be moved to selectively engage a driven member with a driving member, and hydraulic means for moving said members to be moved, means for driving said driven members comprising an input shaft, an engine, a friction clutch for coupling the shaft to the engine and means for actuating the clutch comprising a cylinder having a piston slidably disposed therein and connected to a movable part of the clutch, a source of fluid under pressure, a fluid return reservoir, a hydraulically operated main valve for actuating the piston, said main valve being connected to the cylinder, the fluid source and the fluid return reservoir, an electromagnetically operated primary valve of smaller volume than that of the main valve for actuating the main valve, said primary valve being in fluid connection with the main valve, the fluid source and the fluid return reservoir, means comprising an electrical control unit for actuating the primary valve, and a fluid flow restriction means having a one-way valve parallel thereto effective only to allow fluid flow towards the piston-cylinder assembly from said valve arrangement.

* * * * *